(12) United States Patent
He et al.

(10) Patent No.: US 11,945,042 B2
(45) Date of Patent: Apr. 2, 2024

(54) WIRE AND ARC ADDITIVE MANUFACTURING METHOD FOR MAGNESIUM ALLOY

(71) Applicant: NORTHEASTERN UNIVERSITY, Shenyang (CN)

(72) Inventors: Changshu He, Shenyang (CN); Jingxun Wei, Shenyang (CN); Ying Li, Shenyang (CN); Zhiqiang Zhang, Shenyang (CN); Ni Tian, Shenyang (CN); Gaowu Qin, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 330 days.

(21) Appl. No.: 17/287,954

(22) PCT Filed: Jan. 17, 2020

(86) PCT No.: PCT/CN2020/072656
§ 371 (c)(1),
(2) Date: Apr. 22, 2021

(87) PCT Pub. No.: WO2020/156224
PCT Pub. Date: Aug. 6, 2020

(65) Prior Publication Data
US 2021/0402506 A1  Dec. 30, 2021

(30) Foreign Application Priority Data

Jan. 28, 2019  (CN) .......................... 201910079686.0

(51) Int. Cl.
B23K 20/00 (2006.01)
B23K 9/04 (2006.01)
(Continued)

(52) U.S. Cl.
CPC .......... *B23K 20/1255* (2013.01); *B23K 9/042* (2013.01); *B23K 20/2333* (2013.01);
(Continued)

(58) Field of Classification Search
CPC ...... B23K 26/342; B23K 9/042; B23K 9/173; B23K 20/1225; B23K 2103/14;
(Continued)

(56) References Cited

U.S. PATENT DOCUMENTS

| 5,616,258 A | * | 4/1997 | Dreizin | ................ | B23K 9/0008 |
| | | | | | 219/56.22 |
| 2013/0105450 A1 | * | 5/2013 | Waldhoer | ............... | B23K 9/044 |
| | | | | | 219/121.64 |

(Continued)

*Primary Examiner* — Erin B Saad
(74) *Attorney, Agent, or Firm* — Foster Swift Collins & Smith PC; Mikhail Murshak

(57) ABSTRACT

The present disclosure provides a wire and arc additive manufacturing (WAAM) method for a magnesium alloy. The method includes the following steps: step 1: performing a WAAM process assisted by cooling and rolling; step 2: milling side and top surfaces of an additive part; step 3: performing, by friction stir processing (FSP) equipment, an FSP process on the additive part, and applying cooling and rolling to a side wall of the additive part through a cooling and rolling device during the FSP process; step 4: finish-milling the top surface of the additive part for a WAAM process in the next step; and step 5: repeating the above steps cyclically until final forming of the part is finished. The present disclosure completely breaks dendritic structures and refines grains in the WAAM process of the magnesium alloy, thereby effectively repairing defects such as pores and cracks.

7 Claims, 3 Drawing Sheets

(51) Int. Cl.
*B23K 20/12* (2006.01)
*B23K 20/233* (2006.01)
*B33Y 40/20* (2020.01)
*B33Y 70/00* (2020.01)
*B23K 103/08* (2006.01)

(52) U.S. Cl.
CPC ............... *B33Y 40/20* (2020.01); *B33Y 70/00* (2014.12); *B23K 2103/15* (2018.08)

(58) Field of Classification Search
CPC .. B23K 26/1423; B23K 9/125; B23K 9/0008; B33Y 10/00; B33Y 30/00; B33Y 40/20; B33Y 50/02; G05B 19/40937; G05B 2219/49023; G05B 2219/49007
See application file for complete search history.

(56) References Cited

U.S. PATENT DOCUMENTS

| | | | |
|---|---|---|---|
| 2015/0056584 A1* | 2/2015 | Boulware | B23K 9/0956 434/234 |
| 2017/0239753 A1* | 8/2017 | Yerazunis | B23K 26/342 |
| 2020/0262005 A1* | 8/2020 | Massey, Jr. | G05B 19/41865 |
| 2021/0402506 A1* | 12/2021 | He | B23K 20/2333 |

* cited by examiner

WIRE AND ARC ADDITIVE MANUFACTURING METHOD FOR MAGNESIUM ALLOY

CROSS REFERENCE TO RELATED APPLICATIONS

The present application is the National Stage of PCT/CN2020/072656 filed Jan. 17, 2020, which claims priority to the Chinese Patent Application No. 201910079686.0, filed with China National Intellectual Property Administration (CNIPA) on Jan. 28, 2019, and entitled "WIRE AND ARC ADDITIVE MANUFACTURING METHOD FOR MAGNESIUM ALLOY", which is incorporated herein by reference in its entirety.

TECHNICAL FIELD

The present disclosure belongs to the technical field of metal additive manufacturing (AM), and relates to a wire and arc additive manufacturing (WAAM) method for a magnesium alloy, in particular to a WAAM method assisted by cooling and rolling and friction stir processing (FSP) for a magnesium alloy.

BACKGROUND

Wire and arc additive manufacturing (WAAM) is an advanced manufacturing technology used to build up a three-dimensional (3D) metal part layer by layer according to a 3D digital model under program control by adding a metal wire according to the principle of discrete deposition. Depending on the nature of the heat source, there are commonly three types of WAAM processes: gas metal arc welding (GMAW)-based, gas tungsten arc welding (GTAW)-based and plasma arc welding (PAW)-based. Compared with additive manufacturing (AM) that uses laser and electron beams as heat sources, WAAM has the following advantages. 1) WAAM has high deposition rate, high wire utilization and low manufacturing cost. 2) WAAM can form materials with high laser reflectivity, such as aluminum alloy. 3) WAAM is not limited by the size of equipment such as forming cylinder and vacuum chamber, and is easy to manufacture large-scale components.

As a lightweight structural alloy, magnesium alloy has high specific strength and excellent processability, electromagnetic shielding performance, castability and weldability, and has huge application prospects in the fields of automobile, aerospace and electronics, etc. At present, in order to further realize lightweight, the preparation of magnesium alloy integral components is an important development trend. However, since the shapes of the integral components are usually complicated, they are difficult to manufacture by using traditional forging and casting methods. Therefore, the use of the WAAM technology with high forming efficiency, low manufacturing cost and flexible manufacturing form to prepare magnesium alloy structural parts has important practical significance. However, because magnesium alloy has low melting point and high linear expansion coefficient and thermal conductivity, metallurgical defects such as oxidation, combustion, cracks and pores are likely to occur during the welding process. Therefore, the use of magnesium alloy for melting-based additive manufacturing (AM) is extremely challenging, and there are some problems needing to be solved urgently for the WAAM of the magnesium alloy.

(1) Forming Accuracy Control (Shape Control)

Forming accuracy is mainly measured by two indicators: geometrical (dimensional) accuracy and surface roughness. During the additive process, multiple thermal cycles will generate high thermal stresses, which will cause deformations of the formed part and base plate, bringing difficulties to the control of dimensional accuracy. In addition, due to the serious heat accumulation and poor heat dissipation during the WAAM process, it is easy to cause collapse and "sagging" at the joint between layers, and the formed surface is prone to unevenness, which will eventually lead to an increase in the surface roughness of the formed part.

(2) Microstructure Control (Performance Control)

1) In the WAAM process, the formed part is easy to have coarse columnar crystals and segregation-induced inhomogeneous chemical composition, which will further cause property deteriorations, such as grain boundary brittleness and intergranular corrosion (IGC).

2) In the WAAM process, defects such as pores and thermally induced cracks are easy to appear, which will reduce the density and corrosion resistance of the deposited metal, reduce the effective bearing area of the additive part, and easily cause stress concentration, thereby reducing the strength and plasticity of the additive part.

As common problems faced by the WAAM technology, shape and performance control are also the current research hotspot in this field. At present, in terms of shape control, the problem of sagging and collapse is mainly solved by heat input control means such as welding process parameter optimization and path planning, and the problem of rough surface of the formed part is mainly solved by finishing after forming or applying other methods during the forming process. In terms of performance control, in recent years, domestic and foreign scholars have proposed the use of forging, rolling, ultrasonic oscillation and other methods in the WAAM process to eliminate pores, break dendrites and refine the formed microstructure, so as to achieve the purpose of improved properties. Huazhong University of Science and Technology (HUST) in China and Cranfield University in the United Kingdom have proposed methods to refine the microstructure of the deposited layer by rolling deformation in the WAAM process. The rolling deformation proposed by HUST is closer to "in-situ rolling", that is, a specially designed roll or extrusion device is located directly behind the welding gun and moves with the welding gun (Haiou, Z., Xiangping, W., Guilan, W., & Yang, Z. Hybrid direct manufacturing method of metallic parts using deposition and micro continuous rolling. Rapid Prototyping Journal, 2013, 19(6): 387-394.). The method proposed by Cranfield University is "interlayer rolling", that is, rolling is applied after one or several layers deposited by arc welding are cooled to ambient temperature (Colegrove, P A, Coules, H E, Fairman, J., Martina, F., Kashoob, T., Mamash, H., & Cozzolino, L D. Microstructure and residual stress improvement in wire and arc additively manufactured parts through high-pressure rolling. Journal of Materials Processing Technology, 2013, 213(10): 1782-1791.). The rolling method reduces the porosity, and enables static recrystallization (SRX) in the treatment zone of the formed part. Due to the SRX, the grain size is reduced to less than 30 μm, of which the 0-5 μm grains account for about 49%, the 5-10 μm grains account for about 30%, and the 10-30 μm grains account for the rest. The effect of "in-situ rolling" and "interlayer rolling" in improving the solidification structure is related to the strain applied during the forming process. In other words, a greater rolling force applied leads to a denser and finer structure. But this also leads to obvious limitations in the forming of complex thin-walled components.

Chinese patent CN106735967 A discloses a shape and performance control method for an ultrasonic vibration assisted WAAM process. During the WAAM process, this method applies non-contact ultrasonic vibration to the molten pool synchronously to break crystal grains in the molten pool and inhibit the growth of the crystal grains, so as to refine the grains. However, this method does not solve the problems of pores and grain boundary liquefaction occurring in the WAAM process.

Friction stir processing (FSP) is a technology developed on the basis of friction stir welding (FSW) for material microstructure modification and preparation of new materials. Similar to FSW, in FSP, a high-speed rotating pin of the tool is inserted into the material, and the strong stirring motion of the pin causes the material of the workpiece to undergo violent plastic deformation, mixing and break. In this way, the FSP process realizes the densification, homogenization and refinement of the material microstructure and improves the properties of the material. FSP has achieved good results in the preparation of fine-grain/ultra-fine-grain materials and surface/bulk composite materials, microstructure modification of heterogeneous materials, and local hardening/defect repairs of workpieces. Specifically, FSP has the following advantages. (1) Refine grains and improve material properties. In the FSP process, under the combined conditions of large strain and high temperature, uniformly refined equiaxed grains are generated in the stir zone through dynamic recrystallization (DRX), which improves the mechanical properties of the material. (2) Eliminate defects and obtain a uniform and dense microstructure of the material. The FSP can break coarse second phase particles and aluminum dendrites of the cast aluminum alloy, eliminate casting pores and refine matrix grains, thereby significantly improving the mechanical properties of the material, especially plasticity and fatigue properties. By using the FSP technology to modify the hypereutectic A390 aluminum-silicon alloy, T. S. Mahmoud found that the FSP technology can reduce casting shrinkage porosity and has obvious refining effect on α-Al and Si particles (Mahmoud T S. Surface modification of A390 hypereutectic Al—Si cast alloys using friction stir processing. Surface & Coatings Technology, 2013, 228(9): 209-220.). In addition, a report has shown that FSP treatment performed in the weld of a fusion welded joint can cause DRX to eliminate welding defects such as dendrite segregation, pores and thermally induced cracks, thereby improving the overall properties of the joint (GK Padhy. Friction stir based welding and processing technologies-processes, parameters, microstructures and applications: A review. Journal of Materials Science & Technology, 2018, 34(9):1-38.). (3) Reduce structural residual stress. As FSP is a solid-state processing technology with low heat input, the thermal deformation and residual stresses of the material after processing are small.

In summary, the combination of interlayer FSP modification in the WAAM process of magnesium alloy helps to refine the internal microstructure of the additive part, eliminate defects such as pores and cracks, and achieve a dense microstructure with uniform chemical composition. In addition, it can reduce thermal deformation, reduce residual stress, and improve the mechanical properties of the additive part. However, when the FSP method is used to modify the additive part, the stir zone of the stirring pin is limited, which makes it difficult to process the metal on the side wall of the additive part, so the side wall metal still retains the cast microstructure. In addition, in the subsequent WAAM process or FSP modification, the microstructure of the deposited metal modified by FSP in the previous layer will be coarsened due to multiple thermal cycles, resulting in a decrease in the properties of the additive part.

SUMMARY

In order to solve the problems existing in the prior art, the present disclosure provides a wire and arc additive manufacturing (WAAM) method for a magnesium alloy.

A WAAM method for a magnesium alloy, including the following steps:
step 1: drawing a part model through three-dimensional (3D) drawing software; performing layered slicing on the part model through slicing software to acquire layered slice data; simulating the layered slice data through simulation software to generate a robot control code; importing the robot control code into a welding robot; performing, by the welding robot, a WAAM process with a magnesium alloy on a pre-prepared base plate to form a multi-layer deposited metal including a total of 2 to 4 layers; applying, during the forming process, cooling and rolling to a side wall of the multi-layer deposited metal through a cooling and rolling device, where during cooling and rolling, 10-30° C. cooling water flows at a rate of 500-2,000 L/h, and a rolling stress on the multi-layer deposited metal is 20-200 MPa;
step 2: milling side and top surfaces of the multi-layer deposited metal;
step 3: performing, by an FSP device, an FSP process on the multi-layer deposited metal after milling, and applying cooling and rolling to the side wall of the multi-layer deposited metal through the cooling and rolling device during the FSP process, where during cooling and rolling, 10-30° C. cooling water flows at a rate of 500-2,000 L/h, and a rolling stress on the multi-layer deposited metal is 50-300 MPa;
step 4: finish-milling the top surface of the multi-layer deposited metal to make the treatment surface smooth for a WAAM process in the next step; and
step 5: repeating the above steps cyclically until the multi-layer deposited metal is formed into an additive part with a preset shape and size, where
the cooling and rolling device includes a roller, a heat conducting cylinder and a heat conducting outer ring; the heat conducting outer ring is rotatably assembled on an outer wall of the heat conducting cylinder; the heat conducting cylinder is provided with an inner cavity; an upper surface of the heat conducting cylinder is provided with a cooling water inlet communicating with the inner cavity; a lower surface of the heat conducting cylinder is provided with a cooling water outlet communicating with the inner cavity; the roller is vertically fixed and assembled at a center of the upper surface of the heat conducting cylinder, and the roller moves synchronously with a welding gun of the welding robot or a stirring tool of the FSP device.

In step 1, the WAAM process is performed according to parameters including: welding current 60-300 A, welding voltage 15.2-25.0 V, wire swing amplitude 2.1-5.6 mm, wire swing speed 600-1,600 mm/min, forming speed 140-400 mm/min, and lifting height of the welding gun at each layer 0.8-2.1 mm.

In step 1, the multi-layer deposited metal formed by the WAAM process is 7-50 mm in width.

In step 1, the multi-layer deposited metal is formed by single-pass multi-layer deposition or multi-pass multi-layer deposition.

In step 2, a milling rate on the side and top surfaces of the multi-layer deposited metal is 0.1-0.5 mm and 0.3-2.2 mm, respectively.

In step 3, a length of a pin of the stirring tool of the FSP device is greater than a height of the multi-layer deposited metal after milling, and a diameter of a shoulder of the stirring tool is slightly smaller than a width of the multi-layer deposited metal after milling.

The FSP device adopts parameters including: shoulder diameter of the stirring tool 6-46 mm, pin length 2-5 mm, rotation speed of the stirring tool 400-1,500 r/min, traveling speed 40-300 mm/min, and inclination angle of the stirring tool 1.5-3°.

The present disclosure provides a WAAM method assisted by cooling and rolling and FSP for a magnesium alloy. In the cooling and rolling assisted WAAM process, the formed multi-layer deposited metal is subject to cooling and rolling and FSP modification after every 2 to 4 layers of magnesium alloy are deposited.

In the cooling and rolling assisted WAAM process, the cooling and rolling device cools and rolls the side wall of the multi-layer deposited metal while the magnesium alloy is deposited layer by layer by an arc. This helps to reduce a thermal impact of the deposition process on a previous layer of metal, and can control geometrical dimensions of the multi-layer deposited metal through the effect of rolling. In the process of cooling and rolling and FSP modification of the deposited metal, the cooling and rolling device and the shoulder of the stirring tool form a partial cavity to ensure that the multi-layer deposited metal surrounded by the cavity has a defect-free forged microstructure formed under the action of the cooling and rolling device and the stirring tool. Meanwhile, a cooler on the cooling and rolling device avoids coarsening of the microstructure due to overheating of a FSP stir zone and the previous layer of metal. In this way, the multi-layer deposited metal is formed with an excellent microstructure, and the mechanical properties of the multi-layer deposited metal are improved. In addition, the problems of poor dimensional accuracy and roughness of the additive part are prevented.

Compared with the prior art, the present disclosure has significant advantages in improving the dimensional accuracy of the component and reducing the roughness of the component. Above all, in the WAAM process of the magnesium alloy, the present disclosure completely destroys dendritic growth and refines grains, thereby effectively repairing defects such as pores and cracks. In addition, in the WAAM and modification process, the present disclosure prevents, by applying cooling, overheating of the multi-layer deposited metal and coarsening of the microstructure caused thereby, thus greatly improving the mechanical properties of the multi-layer deposited metal, especially plasticity and fatigue properties. The cooling and rolling device of the present disclosure has high flexibility and is suited for WAAM of straight-walled structural parts and curved structural parts.

Figure 1:
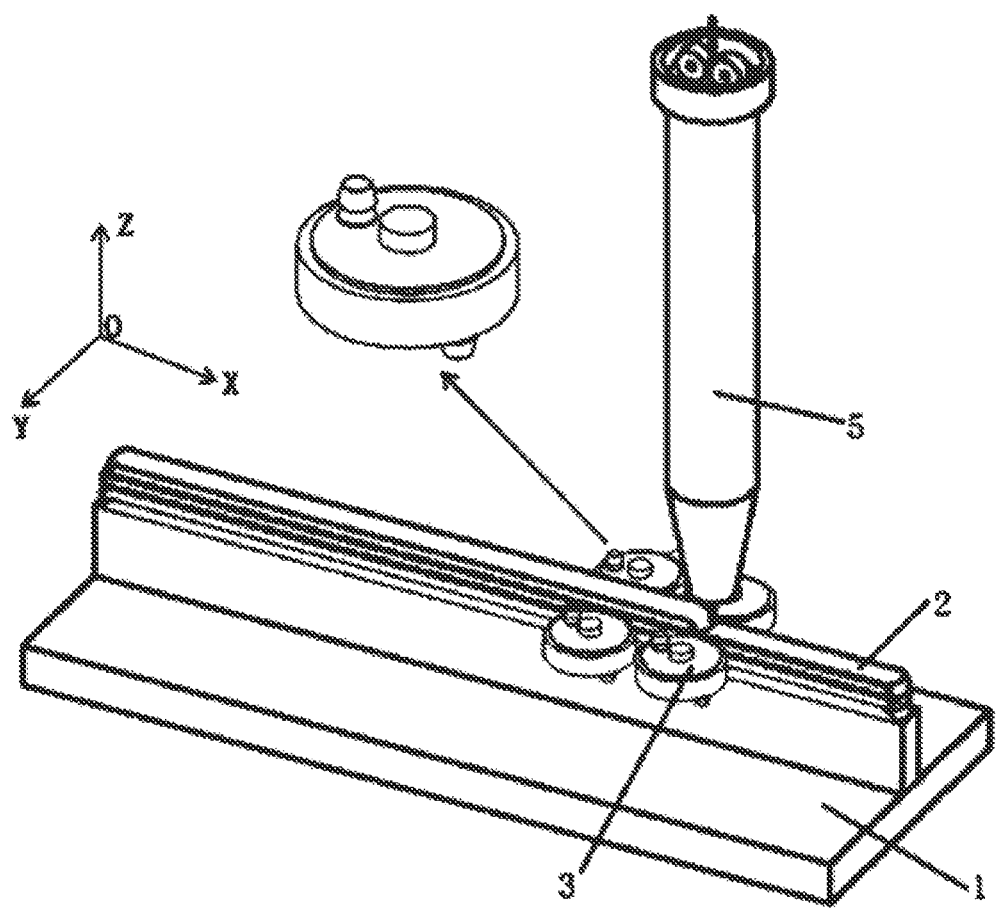
FIG. 1 is a schematic view of a wire and arc additive manufacturing (WAAM) process assisted by cooling and rolling according to the present disclosure.

Reference Numerals: 1. base plate; 2. multi-layer deposited metal; 3. cooling and rolling device; 31. roller; 32. heat conducting cylinder; 33. heat conducting outer ring; 34. inner cavity; 35. cooling water inlet; 36. cooling water outlet; 37. ball; 4. stirring tool; 5. welding gun; and 6. milling cutter.

DETAILED DESCRIPTION

The present disclosure is further described below with reference to the embodiments and accompanying drawings.

It should be noted that all directional indications (such as upper, lower, left, right, front and back) in the embodiments of the present disclosure are merely used to explain a relative position relationship or motions of components in a specific gesture (as shown in the drawings). If the specific gesture changes, the directional indications will change accordingly.

Embodiment 1

Figure 2:
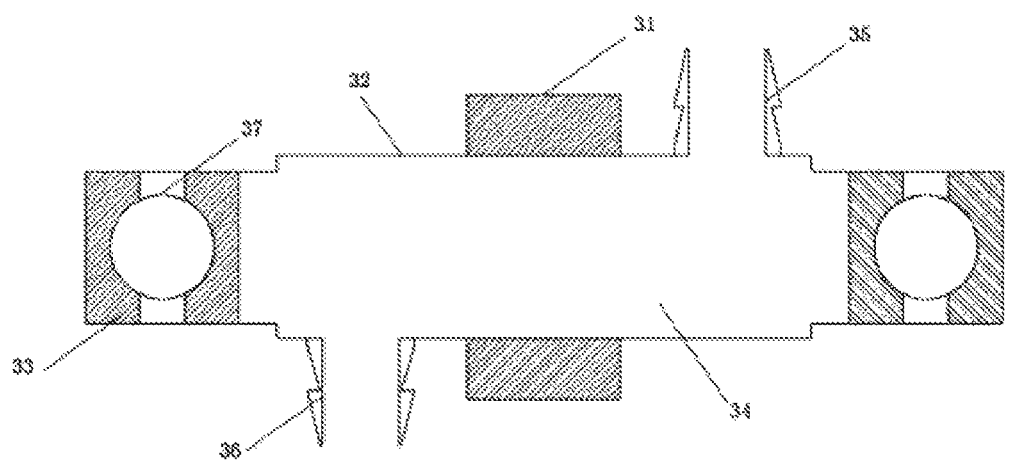
FIG. 2 is a sectional view of a cooling and rolling device according to the present disclosure.
Figure 3:
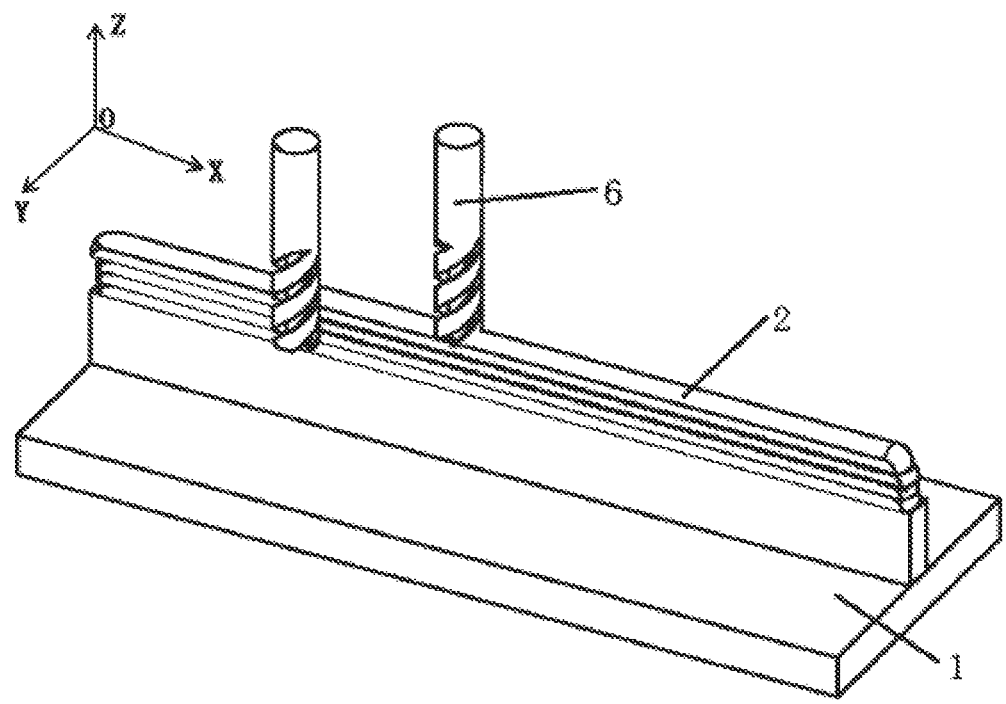
FIG. 3 is a schematic view of milling side and top surfaces of a multi-layer deposited metal according to the present disclosure.
Figure 4:
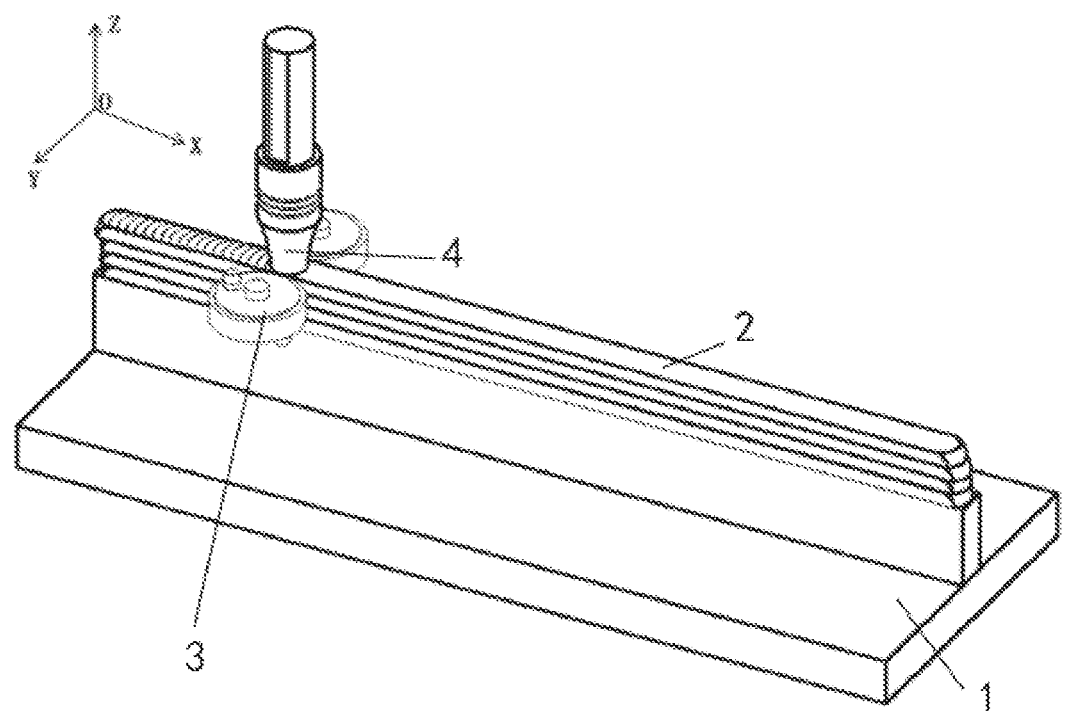
FIG. 4 is a schematic view of friction stir processing (FSP) assisted by cooling and rolling according to the present disclosure.

As shown in FIGS. 1 to 4, the present disclosure provides a method for fabricating a Φ1.2 mm AZ31 magnesium alloy straight-walled part by wire and arc additive manufacturing (WAAM). The method includes the following steps:

Step 1: A cooling and rolling-assisted WAAM process is performed. A model of a 300 mm (length)×100 mm (height)×13 mm (width) straight-walled part is drawn through three-dimensional (3D) drawing software. Layered slicing is performed on the part model through slicing software to acquire layered slice data. The layered slice data is simulated through simulation software, and a forming path is optimized to generate a robot control code (or a digital control code). The robot control code is imported into a welding robot. A WAAM process is performed by the welding robot on a pre-prepared T-shaped base plate 1 by using an arc generated by a tungsten inert gas (TIG) welder as a heat source to form a multi-layer deposited metal 2 including a total of 2 to 4 layers of AZ31 magnesium alloy. The multi-layer deposited metal 2 is 13 mm in width, and the multi-layer deposited metal 2 is formed by single-pass multi-layer deposition. The WAAM process is performed according to parameters including: welding current 90 A, welding voltage 19.7 V, pulse frequency 5 Hz, diameter of a tungsten electrode 2.4 mm, forming speed 200 mm/min, lifting height of a welding gun at each layer 1.5 mm, wire swing amplitude 2.75 mm and wire swing speed 851 mm/min.

Meanwhile, cooling and rolling is applied to a side wall of the multi-layer deposited metal 2 through a cooling and rolling device 3 during the forming process. The cooling and rolling applied to the side wall of the multi-layer deposited metal 2 by the cooling and rolling device 3 helps to reduce a thermal impact of the deposition process on a previous layer of metal, and can control geometrical dimensions of the multi-layer deposited metal 2 through the effect of rolling. During cooling and rolling, 15° C. cooling water flows at a rate of 1,800 L/h, and a rolling stress on the multi-layer deposited metal is 50 MPa.

Step 2: Side and top surfaces of the multi-layer deposited metal 2 are milled by a milling robot by using a milling cutter 6. This step aims to control the dimensional accuracy of the multi-layer deposited metal 2 and provide a smooth surface for subsequent friction stir processing (FSP) so as to prevent defects occurring in the FSP process. Two side surfaces of the multi-layer deposited metal 2 are milled with a milling rate of 0.3 mm, and a top surface of the multi-layer deposited metal is milled with a milling rate of 2 mm. During the milling process, the milling rate, feed speed and other process parameters are set according to a dimensional accuracy required by a final part.

Step 3: An FSP process is performed by an FSP device on the multi-layer deposited metal 2 after milling. A length of a pin of a stirring tool 4 of the FSP device is greater than a height of the multi-layer deposited metal 2 after milling, and a diameter of a shoulder of the stirring tool 4 is slightly smaller than a width of the multi-layer deposited metal 2 after milling. Thus, the microstructure of the multi-layer deposited metal 2 can be refined to the greatest extent so as to eliminate defects. Specifically, the FSP device adopts parameters including: shoulder diameter of the stirring tool 4: 12.5 mm; pin length: 4 mm; rotation speed of the stirring tool 4: 1,500 r/min; traveling speed: 118 mm/min; and inclination angle of the stirring tool 4: 2.5°.

Meanwhile, cooling and rolling is applied to the side wall of the multi-layer deposited metal 2 through the cooling and rolling device 3 during the FSP process. The cooling and rolling device and the shoulder of the stirring tool 4 form a partial cavity to ensure that the multi-layer deposited metal 2 surrounded by the cavity has a defect-free forged microstructure formed under the action of the cooling and rolling device and the stirring tool 4. Meanwhile, the cooling water filled in the cooling and rolling device 3 avoids coarsening of the microstructure due to overheating of a FSP stir zone and the previous layer of metal. During cooling and rolling, 15° C. cooling water flows at a rate of 1,800 L/h, and a rolling stress on the multi-layer deposited metal is 100 MPa.

Step 4: The top surface of the multi-layer deposited metal 2 is finish-milled at a milling rate of 0.3 mm by the milling cutter 6 of the milling robot or a milling machine tool to make the treatment surface smooth for a WAAM process in the next step.

Step 5: The above steps are repeated cyclically until the multi-layer deposited metal 2 is formed into an additive part with a preset shape and size.

The cooling and rolling device 3 includes a roller 31, a heat conducting cylinder 32 and a heat conducting outer ring 33. The heat conducting outer ring 33 is rotatably assembled on an outer wall of the heat conducting cylinder 32 through a ball 37. The heat conducting cylinder 32 is provided with an inner cavity 34. An upper surface of the heat conducting cylinder 32 is provided with a cooling water inlet 35 communicating with the inner cavity 34; a lower surface of the heat conducting cylinder 32 is provided with a cooling water outlet 36 communicating with the inner cavity 34. The roller 31 is vertically fixed and assembled at a center of the upper surface of the heat conducting cylinder 32, and the roller 31 moves synchronously with a welding gun 5 of the welding robot or a stirring tool 4 of the FSP device.

The heat conducting cylinder 32 and the heat conducting outer ring 33 may be made of a metal material with good heat conductivity.

The present disclosure ensures that the microstructure in the stir zone treated by the cooling and rolling and FSP is composed of fine equiaxed grains, and eliminates defects such as pores, holes and liquefaction cracks that are easily generated in an ordinary WAAM process, thereby improving the mechanical properties of the formed part. Table 1 shows data of mechanical properties of AZ31 magnesium alloy thin-walled parts formed by a WAAM process assisted by cooling and rolling and FSP, an ordinary WAAM process and a casting process.

TABLE 1

Comparison of mechanical properties

| | Parallel to the welding direction (X) | | |
|---|---|---|---|
| | Yield strength $\sigma_{0.2}$/MPa | Tensile strength $\sigma_s$/MPa | Elongation $\delta$/% |
| AZ31 magnesium alloy thin-walled part formed by WAAM process assisted by cooling and rolling and FSP | 208.6 | 312.0 | 28.6 |
| AZ31 magnesium alloy thin-walled part formed by ordinary WAAM process | 100 | 285 | 25.6 |
| AZ31 magnesium alloy thin-walled part formed by casting process | 75 | 163 | 3.8 |

Embodiment 2

This embodiment provides a method for fabricating a Φ1.2 mm AZ31 magnesium alloy straight-walled part by WAAM. The method includes the following steps:

Step 1: A cooling and rolling-assisted WAAM process is performed. A model of a 300 mm (length)×100 mm (height)×42 mm (width) straight-walled part is drawn through 3D drawing software. Layered slicing is performed on the part model through slicing software to acquire layered slice data. The layered slice data is simulated through simulation software, and a forming path is optimized to generate a robot control code (or a digital control code). The robot control code is imported into a welding robot. A WAAM process is performed by the welding robot on a pre-prepared T-shaped base plate 1 by using an arc generated by a TIG welder as a heat source to form a multi-layer deposited metal 2 including a total of 2 to 4 layers of AZ31 magnesium alloy. The multi-layer deposited metal 2 is 42 mm in width, and the multi-layer deposited metal 2 is formed by multi-pass multi-layer deposition. The WAAM process is performed according to parameters including: welding current 200 A, welding voltage 23.5 V, pulse frequency 5 Hz, diameter of a tungsten electrode 2.4 mm, forming speed 400 mm/min, lifting height of a welding gun at each layer 0.8 mm, wire swing amplitude 5.6 mm and wire swing speed 1,600 mm/min.

Meanwhile, cooling and rolling is applied to a side wall of the multi-layer deposited metal 2 through a cooling and rolling device 3 during the forming process. The cooling and rolling applied to the side wall of the multi-layer deposited metal 2 by the cooling and rolling device 3 helps to reduce a thermal impact of the deposition process on a previous layer of metal, and can control geometrical dimensions of the multi-layer deposited metal 2 through the effect of rolling. During cooling and rolling, 10° C. cooling water flows at a rate of 1,000 L/h, and a rolling stress on the multi-layer deposited metal is 150 MPa.

Step 2: Side and top surfaces of the multi-layer deposited metal 2 are milled by a milling robot by using a milling cutter 6. This step aims to control the dimensional accuracy of the multi-layer deposited metal 2 and provide a smooth surface for a subsequent FSP process so as to prevent defects occurring in the FSP process. Two side surfaces of the multi-layer deposited metal 2 are milled with a milling rate of 0.3 mm, and a top surface of the multi-layer deposited metal is milled with a milling rate of 2 mm. During the milling process, the milling rate, feed speed and other process parameters are set according to a dimensional accuracy required by a final part.

Step 3: An FSP process is performed by an FSP device on the multi-layer deposited metal 2 after milling. A length of a pin of a stirring tool 4 of the FSP device is greater than a height of the multi-layer deposited metal 2 after milling, and a diameter of a shoulder of the stirring tool 4 is slightly smaller than a width of the multi-layer deposited metal 2 after milling. Thus, the microstructure of the multi-layer deposited metal 2 can be refined to the greatest extent so as to eliminate defects. Specifically, the FSP device adopts parameters including: shoulder diameter of the stirring tool 4: 40.5 mm; pin length: 3 mm; rotation speed of the stirring tool 4: 400 r/min; traveling speed: 40 mm/min; and inclination angle of the stirring tool 4: 1.5°.

Meanwhile, cooling and rolling is applied to the side wall of the multi-layer deposited metal 2 through the cooling and rolling device 3 during the FSP process. The cooling and rolling device and the shoulder of the stirring tool 4 form a partial cavity to ensure that the multi-layer deposited metal 2 surrounded by the cavity has a defect-free forged microstructure formed under the action of the cooling and rolling device and the stirring tool 4. Meanwhile, the cooling water filled in the cooling and rolling device 3 avoids coarsening of the microstructure due to overheating of an FSP stir zone and the previous layer of metal. During cooling and rolling, 30° C. cooling water flows at a rate of 2,000 L/h, and a rolling stress on the multi-layer deposited metal is 200 MPa.

Step 4: The top surface of the multi-layer deposited metal 2 is finish-milled at a milling rate of 0.3 mm by the milling cutter 6 of the milling robot or a milling machine tool to make the treatment surface smooth for a WAAM process in the next step.

Step 5: The above steps are repeated cyclically until the multi-layer deposited metal 2 is formed into an additive part with a preset shape and size.

The cooling and rolling device 3 includes a roller 31, a heat conducting cylinder 32 and a heat conducting outer ring 33. The heat conducting outer ring 33 is rotatably assembled on an outer wall of the heat conducting cylinder 32 through a ball 37. The heat conducting cylinder 32 is provided with an inner cavity 34. An upper surface of the heat conducting cylinder 32 is provided with a cooling water inlet 35 communicating with the inner cavity 34; a lower surface of the heat conducting cylinder 32 is provided with a cooling water outlet 36 communicating with the inner cavity 34. The roller 31 is vertically fixed and assembled at a center of the upper surface of the heat conducting cylinder 32, and the roller 31 moves synchronously with a welding gun 5 of the welding robot or a stirring tool 4 of the FSP device.

The heat conducting cylinder 32 and the heat conducting outer ring 33 may be made of a metal material with good heat conductivity.

Embodiment 3

This embodiment provides a method for fabricating a Φ1.2 mm AZ31 magnesium alloy straight-walled part by WAAM. The method includes the following steps:

Step 1: A cooling and rolling-assisted WAAM process is performed. A model of a 300 mm (length)×100 mm (height)×7 mm (width) straight-walled part is drawn through 3D drawing software. Layered slicing is performed on the part model through slicing software to acquire layered slice data. The layered slice data is simulated through simulation software, and a forming path is optimized to generate a robot control code (or a digital control code). The robot control code is imported into a welding robot. A WAAM process is performed by the welding robot on a pre-prepared T-shaped base plate 1 by using an arc generated by a TIG welder as a heat source to form a multi-layer deposited metal 2 including a total of 2 to 4 layers of AZ31 magnesium alloy. The multi-layer deposited metal 2 is 7 mm in width, and the multi-layer deposited metal 2 is formed by single-pass multi-layer deposition. The WAAM process is performed according to parameters including: welding current 65 A, welding voltage 15.7 V, pulse frequency 5 Hz, diameter of a tungsten electrode 2.4 mm, forming speed 140 mm/min, lifting height of a welding gun at each layer 2.1 mm, wire swing amplitude 2 mm and wire swing speed 600 mm/min.

Meanwhile, cooling and rolling is applied to the side wall of the multi-layer deposited metal 2 through a cooling and rolling device 3 during the forming process. The cooling and rolling applied to the side wall of the multi-layer deposited metal 2 by the cooling and rolling device 3 helps to reduce a thermal impact of the deposition process on a previous layer of metal, and can control geometrical dimensions of the multi-layer deposited metal 2 through the effect of rolling. During cooling and rolling, 15° C. cooling water flows at a rate of 1,800 L/h, and a rolling stress on the multi-layer deposited metal is 20 MPa.

Step 2: Side and top surfaces of the multi-layer deposited metal 2 are milled by a milling robot by using a milling cutter 6. This step aims to control the dimensional accuracy of the multi-layer deposited metal 2 and provide a smooth surface for a subsequent FSP process so as to prevent defects occurring in the FSP process. Two side surfaces of the multi-layer deposited metal 2 are milled with a milling rate of 0.3 mm, and a top surface of the multi-layer deposited metal is milled with a milling rate of 2 mm. During the milling process, the milling rate, feed speed and other process parameters are set according to a dimensional accuracy required by a final part.

Step 3: An FSP process is performed by an FSP device on the multi-layer deposited metal 2 after milling. A length of a pin of a stirring tool 4 of the FSP device is greater than a height of the multi-layer deposited metal 2 after milling, and a diameter of a shoulder of the stirring tool 4 is slightly smaller than a width of the multi-layer deposited metal 2 after milling. Thus, the microstructure of the multi-layer deposited metal 2 can be refined to the greatest extent so as to eliminate defects. Specifically, the FSP device adopts parameters including: shoulder diameter of the stirring tool 4: 6.5 mm; pin length: 2 mm; rotation speed of the stirring tool 4: 900 r/min; traveling speed: 200 mm/min; and inclination angle of the stirring tool 4: 3°.

Meanwhile, cooling and rolling is applied to the side wall of the multi-layer deposited metal 2 through the cooling and rolling device 3 during the FSP process. The cooling and rolling device and the shoulder of the stirring tool 4 form a partial cavity to ensure that the multi-layer deposited metal 2 surrounded by the cavity has a defect-free forged microstructure formed under the action of the cooling and rolling device and the stirring tool 4. Meanwhile, the cooling water filled in the cooling and rolling device 3 avoids coarsening of the microstructure due to overheating of an FSP stir zone and the previous layer of metal. During cooling and rolling, 15° C. cooling water flows at a rate of 1,800 L/h, and a rolling stress on the multi-layer deposited metal is 120 MPa.

Step 4: The top surface of the multi-layer deposited metal 2 is finish-milled at a milling rate of 0.3 mm by the milling cutter 6 of the milling robot or a milling machine tool to make the treatment surface smooth for a WAAM process in the next step.

Step 5: The above steps are repeated cyclically until the multi-layer deposited metal 2 is formed into an additive part with a preset shape and size.

The cooling and rolling device 3 includes a roller 31, a heat conducting cylinder 32 and a heat conducting outer ring 33. The heat conducting outer ring 33 is rotatably assembled on an outer wall of the heat conducting cylinder 32 through a ball 37. The heat conducting cylinder 32 is provided with an inner cavity 34. An upper surface of the heat conducting cylinder 32 is provided with a cooling water inlet 35 communicating with the inner cavity 34; a lower surface of the heat conducting cylinder 32 is provided with a cooling water outlet 36 communicating with the inner cavity 34. The roller 31 is vertically fixed and assembled at a center of the upper surface of the heat conducting cylinder 32, and the roller 31 moves synchronously with a welding gun 5 of the welding robot or a stirring tool 4 of the FSP device.

The heat conducting cylinder 32 and the heat conducting outer ring 33 may be made of a metal material with good heat conductivity.

By applying cooling through the cooling and rolling device in the WAAM process and FSP modification, the present disclosure prevents overheating of the multi-layer deposited metal and coarsening of the microstructure caused thereby, thus greatly improving the mechanical properties of the multi-layer deposited metal. In addition, the present disclosure achieves the purpose of controlling the geometrical dimensions of the multi-layer deposited metal through the cooling and rolling device.

The above embodiments are merely intended to illustrate the technical solutions of the present disclosure, rather than to make a limitation thereto. Although the present disclosure is described in detail with reference to the above-mentioned embodiments, those of ordinary skill in the art should understand that similar technical methods may still be derived from the technical solutions described in accordance with the accompanying drawings and embodiments. If an arc generated by a welder of metal inert gas (MIG), TIG or plasma arc welding (PAW) is used as the heat source and magnesium alloy wires with different diameters and different alloy element contents are used as the filler metals, in the WAAM process, the interlayer cooling and rolling and FSP methods can be used to eliminate defects such as pores, liquefaction and cracks of the deposited metal and refine the microstructure so as to improve properties. Any simple modifications, equivalent changes and modifications made to the above embodiments based on the technical essence of the present disclosure should fall within the scope of the technical solutions of the present disclosure.

What is claimed is:

1. A wire and arc additive manufacturing (WAAM) method for a magnesium alloy, the method comprising the steps:
    (a) drawing a part model through three-dimensional (3D) drawing software; performing layered slicing on the part model through slicing software to acquire layered slice data; simulating the layered slice data through simulation software to generate a robot control code; importing the robot control code into a welding robot; performing, by the welding robot, a WAAM process with a magnesium alloy on a pre-prepared base plate to form a multi-layer deposited metal including a total of 2 to 4 layers; applying, during the forming process, cooling and rolling to a side wall of the multi-layer deposited metal through a cooling and rolling device, wherein during cooling and rolling, 10-30° C. cooling water flows at a rate of 500-2,000 L/h, and a rolling stress on the multi-layer deposited metal is 20-200 MPa;
    (b) milling side and top surfaces of the multi-layer deposited metal;
    (c) performing, by a friction stir processing (FSP) device, an FSP process on the multi-layer deposited metal after milling, and applying cooling and rolling to the side wall of the multi-layer deposited metal through the cooling and rolling device during the FSP process, wherein during cooling and rolling, 10-30° C. cooling water flows at a rate of 500-2,000 L/h, and a rolling stress on the multi-layer deposited metal is 50-300 MPa;
    (d) finish-milling the top surface of the multi-layer deposited metal to make the treatment surface smooth for a WAAM process in the next step; and
    (e) repeating the above steps cyclically until the multi-layer deposited metal is formed into an additive part with a preset shape and size,
    wherein the cooling and rolling device comprises a roller, a heat conducting cylinder and a heat conducting outer ring; the heat conducting outer ring is rotatably assembled on an outer wall of the heat conducting cylinder; the heat conducting cylinder is provided with an inner cavity; an upper surface of the heat conducting cylinder is provided with a cooling water inlet communicating with the inner cavity; a lower surface of the heat conducting cylinder is provided with a cooling water outlet communicating with the inner cavity; the roller is vertically fixed and assembled at a center of the upper surface of the heat conducting cylinder, and the roller moves synchronously with a welding gun of the welding robot during the forming process, and moves synchronously with a stirring tool of the FSP device during the FSP process.

2. The WAAM method for a magnesium alloy according to claim 1, wherein in step (c), a length of a pin of the stirring tool of the FSP device is greater than a height of the multi-layer deposited metal after milling, and a diameter of a shoulder of the stirring tool is smaller than a width of the multi-layer deposited metal after milling.

3. The WAAM method for a magnesium alloy according to claim 1, wherein in step (a), the multi-layer deposited metal formed by the WAAM process is 7-50 mm in width.

4. The WAAM method for a magnesium alloy according to claim 1, wherein in step (a), the multi-layer deposited metal is formed by single-pass multi-layer deposition or multi-pass multi-layer deposition.

5. The WAAM method for a magnesium alloy according to claim 1, wherein in step (a), the WAAM process is performed according to parameters comprising: welding current 60-300 A, welding voltage 15.2-25.0 V, wire swing amplitude 2.1-5.6 mm, wire swing speed 600-1,600 mm/min, forming speed 140-400 mm/min, and lifting height of the welding gun at each layer 0.8-2.1 mm.

6. The WAAM method for a magnesium alloy according to claim 1, wherein in step (b), a milling rate on the side and top surfaces of the multi-layer deposited metal is 0.1-0.5 mm and 0.3-2.2 mm, respectively.

7. The WAAM method for a magnesium alloy according to claim 2, wherein the FSP device adopts parameters comprising: shoulder diameter of the stirring tool 6-46 mm, pin length 2-5 mm, rotation speed of the stirring tool 400-1,500 r/min, traveling speed 40-300 mm/min, and inclination angle of the stirring tool 1.5-3°.

* * * * *